Patented July 27, 1954

2,684,974

UNITED STATES PATENT OFFICE 2,684,974

PRODUCTION OF CHLOROALKYLHALO-SILANES AND CHLOROCYCLOALKYL-HALOSILANES

David B. Hatcher and Raymond H. Bunnell, Toledo, Ohio, assignors, by mesne assignments, to Allied Chemical & Dye Corporation, New York, N. Y., a corporation of New York No Drawing. Application June 1, 1948, Serial No. 30,507

2 Claims. (Cl. 260—448.2)

The invention relates to the production of chloroalkylhalosilanes containing in the molecule a chlorinated alkyl group having two or more carbon atoms.

An alkyl group having two or more carbon atoms, contained in the molecule of an alkylhalosilane, heretofore has been converted to a chloroalkyl group only by reaction with sulfuryl chloride. In the production of a chloroalkylhalosilane from an alkylhalosilane it is desirable that only one chloro group at a time be added to each alkyl radical so that the reaction may be controlled to give any desired product.

The principal object of the invention is the production of chloroalkylhalosilanes in such a manner that improved control of the reaction can be obtained. More specific objects and advantages are apparent from the description, which discloses and illustrates but is not intended to limit the scope of the invention.

It is known that when chlorine is reacted with a methylhalosilane, the chloromethyl groups that are initially formed are more reactive with chlorine than the methyl groups. Thus the reaction, once started, tends to proceed to the formation of dichloromethyl groups and hence is difficult to control.

The present invention is based upon the discovery that, contrary to expectation, chlorine reacts with an alkyl group having more than one carbon atom, in the molecule of an alkylhalosilane more readily than it reacts with the corresponding chloroalkyl group. Thus the reaction of chlorine with such an alkyl group gives an even higher yield of monochloroalkylhalosilanes than the reaction of sulfuryl chloride with such an alkyl group. Moreover, it has been discovered that reaction of such an alkyl group with chlorine in the practice of the invention tends to give a greater proportion of alpha-chloro groups than reaction with sulfuryl chloride. Alpha-chloro groups are more desirable than beta-chloro groups for certain uses.

In the practice of the present invention chloroalkylhalosilanes are produced by a method that comprises reacting chlorine with a silane whose molecule consists of a silicon atom to which are attached four radicals from two to three of which are halogens each having an atomic weight less than 100, and from one to two of which are saturated monovalent hydrocarbon radicals containing a total of from two to twelve carbon atoms, at least one such hydrocarbon radical having at least two carbon atoms, and any substituent on each such hydrocarbon radical consisting of a single chloro group.

The silanes that are reacted with chlorine in the practice of the invention have, attached to silicon in the silane molecule, two or three hydrolyzable radicals, each of which is a halogen having an atomic weight less than 100 (i. e., fluoro, chloro or bromo), the remaining silicon valences being satisfied by straight, branched or closed chain alkyl radicals or substituted alkyl radicals. The straight, branched or closed chain alkyl radical or radicals have a total of from two to twelve carbon atoms, and if there are two such radicals, one of them may be methyl; the substituent, if any, is a single chloro group on one or both alkyl radicals. Thus, if there is but one alkyl radical attached to the silicon atom in the silane molecule, that alkyl radical is ethyl, propyl, isopropyl, n-butyl, isobutyl, secondary butyl, a primary or secondary alkyl radical having from five to twelve carbon atoms, cyclopentyl, cyclohexyl, bicyclopentyl, bicyclohexyl or a mono-, di- or trialkyl-substituted cyclopentyl or cyclohexyl in which the carbon atoms, in the ring and in the alkyl side chains, are not more than twelve in number. If there are two alkyl radicals attached to the silicon atom in the silane molecule, one of which is methyl, the other may be any radical described above that has eleven or fewer carbon atoms; or the two radicals may be any two of those described above such that the total number of carbon atoms in the two radicals is twelve or fewer. Preferably, the alkyl radicals have no chloro substituent.

Examples of the alkylhalosilanes that may be chlorinated in the practice of the invention include ethyltrifluorosilane, diethyldifluorosilane, n-propyltrifluorosilane, isopropyltrifluorosilane, n-butyltrifluorosilane, di-n-butyldifluorosilane, n-pentyltrifluorosilane, di-n-pentyldifluorosilane, ethyldifluorochlorosilane, ethylfluorodichlorosilane, n-propyldifluorochlorosilane, n-propylfluorodichlorosilane, isopropyldifluorochlorosilane, isopropylfluorodichlorosilane, n-butyldifluorochlorosilane, n-butylfluorodichlorosilane, ethyltrichlorosilane, diethyldichlorosilane, ethyl-n-propyldichlorosilane, ethylisobutyldichlorosilane, n-propyltrichlorosilane, di-n-propyldichlorosilane, isopropyltrichlorosilane, n-butyltrichlorosilane, isobutyltrichlorosilane, n-pentyltrichlorosilane, isopentyltrichlorosilane, n-hexyltrichlorosilane, hexyltrichlorosilanes, dihexyldichlorosilanes, n-octyltrichlorosilane, n-decyltrichlorosilane, n-dodecyltrichlorosilane and cyclohexyltrichlorosilane.

A preferred embodimnet of the invention comprises reacting chlorine with an alkyltrihalosilane in which the alkyl radical is a straight, branched or closed chain having from two to twelve carbon atoms, as hereinbefore described, and each halogen is fluoro, chloro or bromo. Most desirably each halogen is chloro.

Ordinarily, it is most advantageous to conduct the reaction of the invention between chlorine and an alkyltrichlorosilane in which the alkyl radical is a straight or branched chain having from two to four carbon atoms, n-propyltrichlorosilane being the preferred example of such a silane.

It has been found that the reaction of the invention can be used to produce a new chemical compound, namely, a chlorocyclohexyltrichlorosilane.

The reaction of the invention is conducted as a liquid phase reaction or as a vapor phase reaction by bringing molecular chlorine into contact with the liquid or vaporous alkylhalosilane to be chlorinated. The reaction proceeds readily in the vapor phase without any catalyst, but ultra-violet light is required to conduct the reaction in the liquid phase. The reaction is usually conducted at atmospheric pressure and at a slightly elevated temperature, the maximum temperature of a liquid phase reaction at atmospheric pressure being limited by the boiling temperature of the silane to be chlorinated, and the minimum temperature of a vapor phase reaction being so limited. It is desirable that the chlorine be bubbled into the silane when a liquid phase reaction is conducted, in order to avoid high local chlorine concentrations which are likely to result in burning of the silane and a corresponding darkening of the product. The liquid phase chlorination has been found to proceed at such a rate in ordinary laboratory apparatus that about one mol of an alkylhalosilane can be chlorinated per hour when the chlorine is introduced through a single jet. Ordinarily, about one mol of chlorine is used per mol of silane to be monochlorinated, but the amount of chlorine that is used can be regulated to control the extent of the chlorination.

When the reaction is conducted as a liquid phase reaction the silane to be chlorinated is placed in a suitable reactor and chlorine is admitted (at the bottom of the reactor) as comparatively small bubbles. It has been found that the chlorine can be dispersed by means of small glass Raschig rings placed at the bottom of the reactor. Ultra-violet light is used to catalyze the chlorination (e. g., from a high pressure mercury vapor lamp equipped with a filter which absorbs all radiation having a wave length shorter than 2800 Angstrom units, 60 per cent of the radiation having a wave length shorter than 3400 Angstrom units and 10 per cent of the radiation having a wave length shorter than 4400 Angstrom units; such a lamp is the "Mazda CH-4" 100 watt ultra-violet lamp).

The reaction can be initiated at a temperature as low as about 25° C., and its slightly exothermic nature usually results in a slight increase in temperature. It has been found that the reaction proceeds at a faster rate at elevated temperatures, so it is ordinarily preferable to conduct the reaction at a temperature of at least about 35° C., and ordinarily most desirable to conduct it at a temperature of at least about 50° C. The maximum temperature at which a liquid phase reaction is conducted at atmospheric pressure is not higher than the boiling temperature of the silane to be chlorinated, and (if the boiling temperature is higher) it is not desirable, in any event, to conduct the reaction at a temperature higher than about 150° C. It is ordinarily preferable to conduct the reaction at a temperature not higher than about 100° C., and most desirable to conduct it at a temperature not higher than about 75° C.

Liquid phase chlorination of alkylhalosilanes can be conducted at a relatively rapid rate. The chlorine is usually introduced (as comparatively small bubbles) through a jet at a rate not less than about 0.7 mol per hour (if it is desired to chlorinate large quantities of an alkylhalosilane, the chlorine can be introduced simultaneously through each of two or more jets at the specified rate). Ordinarily it is preferable that the rate be at least about 0.8 mol per hour, and most desirable that it be at least about 0.9. Usually it is desirable that chlorine be admitted at a rate not greater than about 1.3 mols per hour. Ordinarily it is preferable that the rate be not greater than about 1.2 mols per hour, and most desirable that it be not greater than about 1.1.

When the reaction of the invention is used to chlorinate a chloroalkylhalosilane, the rate at which the chlorine is added to the silane to be chlorinated is slower than when an alkylhalosilane is to be chlorinated. Usually it is desirable that the chlorine be admitted at a rate of at least about 0.15 mol per hour, preferably at least about 0.20 mol per hour. It is ordinarily desirable that the chlorine be admitted at a rate not greater than about 0.35 mol per hour, and preferable that it be admitted at a rate not greater than about 0.30 mol per hour.

When the reaction is conducted in the vapor phase, it is conducted at a temperature above the boiling temperature of the silane to be chlorinated. It is usually desirable that the reaction be conducted at a temperature substantially above the boiling temperature of the silane, and not lower than about 200° C. Ordinarily, it is preferable that the reaction be conducted at a temperature not lower than about 250° C., and most desirable that it be conducted at a temperature not lower than about 300° C. Usually, it is desirable that the reaction be conducted at a temperature not higher than about 600° C. Ordinarily it is preferable that the reaction be conducted at a temperature not higher than about 500° C., and most desirable that it be conducted at a temperature not higher than about 400° C.

The vapor phase reaction proceeds at a rapid rate, a contact time as low as about 0.01 second being practical in some instances. ("Contact time" is used herein to mean the average time required for a quantity of reactants equal to the volume of the reaction zone, calculated at reaction temperature and pressure, to pass into the reactor.) It is ordinarily preferable that a contact time of at least about 0.5 second be used, and most desirable that a contact time of at least about 1 second be used. The maximum contact time which it is practical to use to conduct the reaction of the invention is usually not longer than about one minute, although contact times as long as about 15 minutes may be used to obtain vapor phase chlorination at low temperatures. Ordinarily it is preferable to use contact times not longer than about 45 seconds, and most desirable to use contact times not longer than about 30 seconds.

Contact time and temperature at which the vapor phase reaction is conducted are interrelated; a shorter contact time should be used when the reaction is conducted at a higher temperature, and a longer contact time when the reaction is conducted at a lower temperature. It is necessary to avoid a long contact time at a high temperature in order to minimize decomposition of the chlorinated products. Thus, the minimum specified contact time should be used when the reaction is conducted at the maximum specified temperature, the longer contact times being used when the reaction is conducted at the lower specified temperatures, e. g., about a 0.5 second contact time when the reaction is conducted at a temperature of about 400° C., and about a 20 second contact time when the reaction is conducted at about 300° C.

Ultra-violet light can be used to catalyze the vapor phase reaction of the invention, and, when it is used, the reaction can ordinarily be conducted at comparatively low temperatures. However, the reaction proceeds readily without any such catalysis, and it is usually preferable to conduct the reaction without catalysis and thus to avoid the necessity of conducting the vapor phase reaction in glass equipment. The reaction of the invention can be conducted at any temperature between about 25° C. and about 600° C., because the liquid phase reaction at atmospheric pressure can be conducted at temperatures as high as about 150° C. (or the boiling temperature of the silane to be chlorinated, whichever is lower), and the vapor phase reaction can be conducted (under reduced pressure, if necessary, to vaporize the silane at temperatures between about 150° C. and the boiling temperature of the silane), with ultra-violet light catalysis, at temperatures between about 150° C. and about 200° C. The vapor phase reaction without catalysis, can be used to conduct the reaction of the invention at temperatures between about 200° C. and about 600° C.

The vapor phase reaction is conducted in such a way that the molar ratio of chlorine to silane to be reacted is comparatively low. A high ratio of chlorine to silane is likely to produce an explosive mixture, to result in burning of the silane, or to give a mixture whose reaction is difficult to control. It is usually not practical to conduct a vapor phase reaction when the molar ratio of chlorine to silane is lower than about 1:10, and it is usually preferable that the ratio be at least about 1:5. Ordinarily, it is not advisable that the ratio of chlorine to silane be greater than about 1:2, and preferable that it be not greater than about 2:5. Most desirably the ratio is not greater than about 1:3.

It is usually desirable that the chlorine and the silane to be chlorinated be preheated to about the reaction temperature before they are mixed in the reaction zone. This preheating allows more rapid reaction because the silane and chlorine react as soon as they are mixed.

The reaction of the invention (as either a liquid phase or a vapor phase reaction) can be conducted continuously or as a batch process. When the reaction is run continuously as a vapor phase reaction the silane is conducted through a tube, and chlorine is introduced through jets along the tube, so that a high concentration of chlorine is avoided; the chlorine and the silane are preheated before they are mixed. Likewise, when the liquid phase reaction of the invention is run continuously, the liquid silane is passed through a tube and the chlorine is admitted through jets along the length of the tube. In each case, the amount of chlorine introduced per hour per jet is such that the ratio of chlorine to silane does not give an explosive mixture at any point in the reactor; the same considerations govern the amount of chlorine when the reaction is conducted continuously as when it is conducted batchwise. The exothermic reaction of the invention tends to cause an increase in the temperature of the reaction mixture. The jets should be so spaced that the temperature of the reaction mixture does not substantially increase or decrease progressively along the length of the reaction tube (i. e., the jets should be sufficiently far apart so that the temperature of the gases into which chlorine is introduced from any one jet is not substantially higher than the temperature of the gases into which chlorine is introduced from any other jet).

Conducting the vapor phase reaction of the invention at elevated pressure may tend to increase the yield, but such a practice is usually not desirable because the pumping equipment required to give the high pressures, which must withstand the action of $Cl_2$ and HCl gas (hydrochloric acid in case any moisture is present) is too expensive. It is usually preferable to conduct the liquid phase reaction at atmospheric pressure.

The reaction of the invention is unique in that the chlorination is selective to a substantial extent, mono-chlorination taking place in preference to di-chlorination. This is true whether a dialkyldihalosilane or an alkyltrihalosilane is chlorinated.

*Example 1*

An alkyltrihalosilane is chlorinated by means of a reaction with molecular chlorine according to the following procedure:

An alkyltrihalosilane (222 grams of ethyltrichlorosilane) is placed in a glass tube approximately three feet in length, having an internal diameter of about 50 mm., packed at the bottom with Raschig rings (to a height of about 5 cm.) and fitted with a gas inlet tube (having an internal diameter of about 6 mm.) which is sealed through the bottom of the tube so that the chlorine is discharged from a vertical section of this tube (near the bottom of the reactor) into the alkyltrihalosilane. The top of the reactor tube is fitted with a Dry-Ice condenser and a glass tube which conducts any gases not condensed in the Dry-Ice condenser to a water scrubber where the HCl formed by the chlorination is removed. The amout of HCl absorbed in the water scrubber is determined by titration with sodium hydroxide. Into the silane (which is at a temperature of about 25° C.) is introduced chlorine (at a temperature of about 25° C.) for about 80 minutes at such a rate that about 1.36 gram mols of hydrogen chloride are collected in the water scrubber during the 80 minutes. The liquid remaining in the reactor is separated by fractional distillation to yield ethyltrichlorosilane (27 grams), alpha-chloroethyltrichlorosilane (88 grams), beta - chloroethyltrichlorosilane (68 grams) and di- and poly-chloroethyltrichlorosilanes (32 grams).

By way of comparison, the results reported by Sommer and Whitmore (Journal of the American Chemical Society, March, 1946, page 486) on the chlorination of 8.0 mols of ethyltrichlorosilane with 8.0 mols of sulfuryl chloride are presented:

| | Mols |
|---|---|
| Recovered ethyltrichlorosilane | 2.7 |
| Alpha-chloroethyltrichlorosilane | 1.1 |
| Beta-chloroethyltrichlorosilane | 2.8 |

Thus, Sommer and Whitmore report that over two mols of beta-chloroethyltrichlorosilane per mol of alpha-chloroethyltrichlorosilane are produced by means of a reaction between ethyltrichlorosilane and sulfuryl chloride, whereas the reaction of the invention yields more alpha-chloroethyltrichlorosilane than beta-chloroethyltrichlorosilane.

*Example 2*

The procedure of the first paragraph of Example 1 is repeated to chlorinate n-propyltrichlorosilane (187 grams). Chlorine is admitted into the reactor until 1.27 mols of hydrogen chloride have been collected in the water scrubber (about 70 minutes). Fractional distillation of the liquid in the reactor yields n-propyltrichlorosilane (30 grams), alpha-chloropropyltrichlorosilane (19 grams), beta-chloropropyltrichlorosilane (78.5 grams), gamma-chloropropyltrichlorosilane (45.5 grams) and di- and poly-chloropropyltrichlorosilanes (51 grams).

*Example 3*

A dialkyldihalosilane (350 grams of diethyldichlorosilane) is chlorinated by a procedure that is the same as that described in the first paragraph of Example 1. Chlorine is admitted into the reactor for about 130 minutes until about 2.23 mols of hydrogen chloride have been collected in the water scrubber. Fractional distillation of the liquid in the reactor yields diethyldichlorosilane (113 grams), alpha-chloroethylethyldichlorosilane, which has a boiling point of 163° C. (101.5 grams), beta-chloroethylethyldichlorosilane, which has a boiling point of 180° C. (114 grams) and di- and poly-chloroethylethyldichlorosilanes (84 grams).

*Example 4*

A chloroalkyltrihalosilane (218 grams of beta-chloroethyltrichlorosilane) is chlorinated by a procedure that is the same as that described in the first paragraph of Example 1. Chlorine is admitted into the reactor for about four hours until 1.07 mols of hydrogen chloride have been collected in the water scrubber. Fractional distillation of the liquid in the reactor yields a mixture of dichloroethyltrichlorosilanes boiling in the range between 78° C. and 83° C. at an absolute pressure of 28 mm. of mercury (136.5 grams) and polychloroethyltrichlorosilanes (19 grams).

The procedure of the preceding paragraph is repeated using, instead of the beta-chloroethyltrichlorosilane, 105 grams of alpha-chloroethyltrichlorosilane, and admitting chlorine into the reactor for about 2½ hours until 0.53 mol of hydrogen chloride has been collected in the water scrubber. Fractional distillation of the liquid in the reactor yields alpha-chloroethyltrichlorosilane (13 grams), alpha,alpha-dichloroethyltrichlorosilane, which has a boiling point of 155° C. (43 grams) and alpha,beta-dichloroethyltrichlorosilane, which has a boiling point of 180° C. (37 grams).

*Example 5*

The procedure of the first paragraph of Example 1 is repeated to chlorinate cyclohexyltrichlorosilane (357 grams). Chlorine is admitted into the reactor until 1.67 mols of hydrogen chloride have been collected in the water scrubber (about 100 minutes). Fractional distillation of the liquid in the reactor yields cyclohexyltrichlorosilane (112 grams) and a mixture of chlorocyclohexyltrichlorosilanes boiling in the range between 108° C. and 111° C. at an absolute pressure of 6 mm. of mercury (174 grams).

*Example 6*

An alkyltrihalosilane is chlorinated by means of a vapor phase reaction with molecular chlorine according to the following procedure:

An alkyltrichlorosilane (a total of 294 grams of ethyltrichlorosilane) is heated to a temperature of about 350° C. and mixed very rapidly (in a glass tube having an internal diameter of 21 mm. and a length of about 25 cm.) with chlorine (a total of about 30 grams) that has been preheated to about 350° C. The chlorine and the silane are added slowly to the glass tube (over a period of about 175 minutes) so that the contact time is about 14 seconds; during the reaction the tube is maintained at a temperature between about 349° C. and about 356° C. The vapors from the tube reactor are condensed in a water cooled condenser followed by a Dry-Ice condenser and are separated by fractional distillation to yield ethyltrichlorosilane (245 grams), alpha-chloroethyltrichlorosilane (25.8 grams) and beta-chloroethyltrichlorosilane (27.7 grams).

The reaction of the invention is particularly advantageous in that it gives a high yield of mono-chlorinated alkylhalosilanes, and in that it gives a substantial yield of alpha-chloroalkylhalosilanes.

We claim:

1. A chlorocyclohexyltrichlorosilane obtained by reacting chlorine at a temperature from about 25° C. to about 600° C. with cyclohexyltrichlorosilane.

2. A method of producing alpha, beta-dichloroethyltrichlorosilane that comprises reacting chlorine at a temperature from about 25° C. to about 600° C. with a chloroethyltrichlorosilane, the molar ratio of said reactants being not greater than about 1:2.

References Cited in the file of this patent

Friedel et al., "Annalen der Chemie," vol. 138 (1866), pages 19–24.

Ushakov et al., "Jour. Gen. Chem.," (U. S. S. R.), vol. 7 (1937), No. 19, pages 2492–2498.

Krieble et al., "Jour. Am. Chem. Soc.," vol. 67 (1945), pages 1810–1812.

Whitmore et al., "Jour. Am. Chem. Soc.," vol. 68 (1946), pages 481–484.

Sommer et al., "Jour. Am. Chem. Soc.," vol. 68, 1946, pages 485–487.

Burkhard et al., "Chemical Reviews," vol. 41 (1947), page 111, pages 113–117.

Bailey et al., "Abstracts of Papers presented at the 111th Meeting of American Chemical Society, Atlantic City, N. J., April 14–18, 1947, pages 30 M, 31 M.